United States Patent
Geurts et al.

(10) Patent No.: US 9,417,703 B2
(45) Date of Patent: Aug. 16, 2016

(54) GESTURE BASED CONTROL OF ELEMENT OR ITEM

(75) Inventors: Lucas Jacobus Franciscus Geurts, Best (NL); Paul Kaufholz, Eindhoven (NL); Hendirkus Petrus Maria Sterken, Deume (NL); Jaap Knoester, Utrecht (NL); Ivo Don Stuyfzand, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 14/006,795

(22) PCT Filed: Apr. 13, 2012

(86) PCT No.: PCT/IB2012/051810
§ 371 (c)(1),
(2), (4) Date: Sep. 23, 2013

(87) PCT Pub. No.: WO2012/143829
PCT Pub. Date: Oct. 26, 2012

(65) Prior Publication Data
US 2014/0047395 A1 Feb. 13, 2014

(30) Foreign Application Priority Data
Apr. 20, 2011 (EP) .................................. 11163125

(51) Int. Cl.
*G06F 3/00* (2006.01)
*G06F 3/01* (2006.01)
(Continued)

(52) U.S. Cl.
CPC .............. *G06F 3/017* (2013.01); *G06F 3/0482* (2013.01); *G06F 3/0485* (2013.01); *G06F 3/04847* (2013.01); *G06F 2203/04101* (2013.01)

(58) Field of Classification Search
CPC ... G06F 3/017; G06F 3/0482; G06F 3/04847; G06F 3/0485

USPC ........................................................ 715/863
See application file for complete search history.

(56) References Cited

U.S. PATENT DOCUMENTS

| 6,570,557 | B1 * | 5/2003 | Westerman et al. | .......... | 345/173 |
| 7,030,861 | B1 * | 4/2006 | Westerman et al. | .......... | 345/173 |

(Continued)

FOREIGN PATENT DOCUMENTS

| EP | 2105844 A2 | 9/2009 |
| JP | 2008210348 A | 9/2008 |
| JP | 2010250492 A | 11/2010 |

OTHER PUBLICATIONS

Wachs et al, "A Gesture-Based Tool for Sterile Browsing of Radiology Images", Journal of the American Medical Informatics Association, vol. 15, No. 3, 2008, p. 321-323.

(Continued)

*Primary Examiner* — David Phantana Angkool

(57) ABSTRACT

Apparatuses (1) for controlling elements (40-70) possibly shown on screens (31) or items (71) possibly represented by the elements (70) comprise detectors (11-13) for detecting features of objects (2) such as body parts in first and second dimensions and converters (14) for converting first features into actions for the elements (40-70) or the items (71). By making the actions dependent on second features, a number of possibilities is increased. First features may be movements of the objects (2) and second features may be absolute or relative positions of the objects (2). First dimensions may be parallel to the screens (31) and second dimensions may be perpendicular or parallel to the screens (31), or vice versa. Actions may comprise browsing groups (4-6) of elements (40-69) at position dependent speeds or browsing one or more groups (4-6) depending on the positions. The items (71) may be lamps, appliances, audio players, video players, whereby their parameters may be adjusted in dependence of the movements and the positions.

11 Claims, 4 Drawing Sheets

(51) Int. Cl.
*G06F 3/0482* (2013.01)
*G06F 3/0484* (2013.01)
*G06F 3/0485* (2013.01)

(56) References Cited

U.S. PATENT DOCUMENTS

| | | | |
|---|---|---|---|
| 7,834,850 B2 | 11/2010 | Boillot | |
| 7,940,250 B2 * | 5/2011 | Forstall | 345/173 |
| 7,975,242 B2 * | 7/2011 | Forstall et al. | 715/863 |
| 8,512,140 B1 * | 8/2013 | Omi | 463/33 |
| 8,593,331 B2 * | 11/2013 | Tsai | G01S 11/02 342/118 |
| 8,638,989 B2 * | 1/2014 | Holz | 382/103 |
| 8,657,681 B2 * | 2/2014 | Kim | 463/31 |
| 8,698,092 B2 * | 4/2014 | Lee et al. | 250/393 |
| 8,702,485 B2 * | 4/2014 | Flury | A63F 13/10 463/34 |
| 8,777,226 B1 * | 7/2014 | Decker, Jr. | 273/406 |
| 8,790,179 B2 * | 7/2014 | Kim | 463/37 |
| 8,854,802 B2 * | 10/2014 | Robinson | G06F 1/1615 349/74 |
| 8,917,906 B2 * | 12/2014 | Lee et al. | 382/103 |
| 9,024,166 B2 * | 5/2015 | Ramos | G11B 20/00826 726/26 |
| 9,134,800 B2 * | 9/2015 | Maeda | G06F 3/017 |
| 9,164,581 B2 * | 10/2015 | Robinson | G06F 3/04815 |
| 2003/0210255 A1 | 11/2003 | Hiraki | |
| 2006/0010400 A1 | 1/2006 | Dehlin et al. | |
| 2006/0187196 A1 | 8/2006 | Underkoffler et al. | |
| 2007/0126696 A1 | 6/2007 | Boillot | |
| 2008/0030460 A1 | 2/2008 | Hildreth et al. | |
| 2009/0058830 A1 | 3/2009 | Herz et al. | |
| 2009/0135135 A1 | 5/2009 | Tsurumi | |
| 2009/0217211 A1 | 8/2009 | Hildreth | |
| 2010/0235786 A1 | 9/2010 | Maizels et al. | |
| 2010/0277411 A1 | 11/2010 | Yee et al. | |
| 2010/0283730 A1 | 11/2010 | Miyazaki | |
| 2010/0302152 A1 | 12/2010 | Kirigaya | |
| 2011/0050629 A1 | 3/2011 | Homma et al. | |
| 2011/0074710 A1 * | 3/2011 | Weeldreyer et al. | 345/173 |
| 2011/0093821 A1 * | 4/2011 | Wigdor et al. | 715/863 |

OTHER PUBLICATIONS

Inside iPhone 3.0: Enhanced Controls for Podcast & Audio Book Playbook, http://www.tuaw.com/2009/06/21/inside-iphone-3-0-enhanced-controls-for-podcast-and-audiobook-pla/, 2015, 4 Pages.

* cited by examiner

GESTURE BASED CONTROL OF ELEMENT OR ITEM

CROSS-REFERENCE TO PRIOR APPLICATIONS

This application is the U.S. National Phase application under 35 U.S.C. §371 of International Application No. PCT/2012/051810, filed on Apr. 13, 2012, which claims priority of European Patent Application No. 11163125.5, filed on Apr. 20, 2011. These applications are hereby incorporated by reference herein.

FIELD OF THE INVENTION

The invention relates to an apparatus for controlling an element or an item.

The invention further relates to a device, a method, a computer program product and a medium.

Examples of such an apparatus are user tracking apparatuses and interfacing apparatuses based on recognizing gestures and using these recognized gestures.

BACKGROUND OF THE INVENTION

US 2009/0217211 A1 discloses an enhanced input using recognized gestures.

US 2010/0235786 A1 discloses enhanced 3D interfacing for remote devices.

SUMMARY OF THE INVENTION

It is an object of the invention to provide an improved apparatus.

Further objects of the invention are to provide a device, a method, a computer program product and a medium.

According to a first aspect, an apparatus is provided for controlling an element or an item, the apparatus comprising a detector for detecting a first feature of an object in a first dimension and a second feature of the object in another second dimension and comprising a converter for converting the first feature into an action to be performed on the element or the item, the action depending on the second feature.

The object may be for example a body part or a physical object held by the body part or a physical object coupled to the body part etc. The body part may be for example a hand or a finger or an arm or a foot or a leg or a nose etc. The element may be for example an icon or a symbol or a thumbnail or a window etc. on a screen. The element may represent data stored in a computer, such as a picture or a program or audio or video etc. The element may represent a controllable item located separately from the screen, such as a lamp, an appliance, an audio player, a video player etc.

The detector is arranged for detecting the first feature of the object in the first dimension and is arranged for detecting the second feature of the object in the other second dimension. The converter is arranged for converting the first feature into the action to be performed on the element or the item represented by the element.

So, via the first feature detected in the first dimension, the action has been defined. By making this action dependent on the second feature, via this second feature an aspect or a type or a parameter etc. of this action has been defined. This increases a number of possibilities, which is a great improvement.

The apparatus is further advantageous in that an operation by a user has become more efficient. In the past, to adapt an aspect or a type or a parameter etc. of an action, the user had to visit for example another location on the screen to make such an adaptation. This is an inefficient procedure. Now, without leaving the element on the screen, the user can make the adaptation. This is a more efficient procedure.

An embodiment of the apparatus is defined by the first feature being a movement of the object and the second feature being a position of the object. According to this embodiment, an interpretation of the movement can be adapted via the position. This position can be defined in view of the screen and/or in view of another object. A movement may include a rotation, a tilt, a pitch, a roll, a yaw, a swipe, a jump etc.

An embodiment of the apparatus is defined by the element being shown on a screen and the item being represented by the element, the first dimension being a direction parallel to the screen and the second dimension being a direction perpendicular to the screen. According to this embodiment, a movement of the object when located closer to the screen and/or at a larger distance from the other object will have a first result and a movement of the object when located at a larger distance from the screen and/or closer to the other object will have a different second result.

An embodiment of the apparatus is defined by the action comprising browsing a group of elements comprising the element at a speed that depends on the position. According to this embodiment, a movement of the object when located closer to the screen and/or at a larger distance from the other object will result in browsing at a first speed and a movement of the object when located at a larger distance from the screen and/or closer to the other object will result in browsing at a different second speed, such as for example a higher speed.

An embodiment of the apparatus is defined by the action comprising browsing a plurality of groups of elements, one group comprising the element, for the position being a first position, and the action comprising browsing one of the groups for the position being another second position. According to this embodiment, a movement of the object when located closer to the screen and/or at a larger distance from the other object will result in browsing at a first level such as an element level and a movement of the object when located at a larger distance from the screen and/or closer to the other object will result in browsing at a different second level such as a group level.

An embodiment of the apparatus is defined by the action comprising browsing at a relatively general scale for the position being a first position, and the action comprising browsing at a relatively specific scale for the position being a different second position. According to this embodiment, a movement of the object when located closer to the screen and/or at a larger distance from the other object will result in browsing at a first scale such as a specific scale and a movement of the object when located at a larger distance from the screen and/or closer to the other object will result in browsing at a different second scale such as a general scale.

An embodiment of the apparatus is defined by the element being shown on a screen and the item being represented by the element, the first dimension being a direction parallel to the screen and the second dimension being another direction parallel to the screen.

According to this embodiment, a movement of the object in for example a horizontal direction when located higher (or lower) will have a first result and a movement of the object in the horizontal direction when located lower (or higher) will have a different second result. Similarly, a movement of the object in for example a vertical direction when located more to the left (or right) will have a third result and a movement of the object in the vertical direction when located more to the right (or left) will have a different fourth result.

An embodiment of the apparatus is defined by the action comprising adjusting a first parameter of the item in dependence of the movement, and the action comprising adjusting another second parameter of the item in dependence of the position. According to this embodiment, for an item in the form of a lamp that produces light, via the movement for example a brightness of the light can be adapted and via the position for example a color of the light can be adapted. For an item in the form of an audio player that produces audio, via the movement for example a volume of the audio can be adapted and via the position for example a frequency of the audio can be adapted, or, for different positions, the volume of different frequency components can be adapted. Both options are possible for one and the same element and without the need to create a new element for each option.

An embodiment of the apparatus is defined by the element being shown on a screen and the item being represented by the element, the first dimension being a direction perpendicular to the screen and the second dimension being a direction parallel to the screen. According to this embodiment, a movement of the object in a direction perpendicular to the screen will have different results in dependence of the object for example having a more left or more right or higher or lower position with respect to the screen.

An embodiment of the apparatus is defined by the object being a body part or a physical object held by or coupled to the body part, and the position preferably being a relative position with respect to another object, the other object being another body part or a rest of the body. Said controlling is also known as a gesture based control. The position could be an absolute position (for example with respect to the screen) but may preferably be a relative position for example with respect to the other object such as for example another body part or a rest of the body. In case the position is an absolute position, the detector should be able to make absolute detections. In case the position is a relative position, the detector needs only to make relative detections, by detecting both objects and their relative positions, without the need for making absolute detections.

An embodiment of the apparatus is defined by the converter being arranged for converting the second feature into information to be shown on a screen or to be reproduced otherwise. According to this embodiment, feedback is provided to the user on the screen or otherwise (via audio or via a signal sent to the object or the item etc.), to assist the user.

It should be noted that the first feature of the object in the first dimension and the second feature of the object in another second dimension are both related to the same element. So, the second feature is not detected via another element located on the screen next to the element when, for the second dimension being the second direction parallel to the screen, travelling in the second dimension. Further, the first feature is converted into the action to be performed on the element or the item represented by the element and the action to be performed on this element or this item represented by this element depends on the second feature. So, the second feature defines an aspect or a type or a parameter etc. of this action.

According to a second aspect, a device is provided comprising the apparatus as defined above and further comprising the item and/or a screen.

According to a third aspect, a method is provided for controlling an element or an item, the method comprising a step of detecting a first feature of an object in a first dimension and a second feature of the object in another second dimension and comprising a step of converting the first feature into an action to be performed on the element or the item, the action depending on the second feature.

According to a fourth aspect, a computer program product is provided for performing the steps of the method as defined above.

According to a fifth aspect, a medium is provided for storing and comprising the computer program product as defined above.

Embodiments of the method correspond with the embodiments of the apparatus.

An insight could be that more than one dimension could be used for controlling an element possibly shown on a screen or for controlling an item possibly represented by the element and possibly located separately from the screen. A basic idea could be that by detecting first and second features of an object in first and second dimensions and by converting the first feature into an action to be performed on the element or the item, a number of possibilities can be increased by making the action dependent on the second feature.

A problem to provide an improved apparatus has been solved. A further advantage could be that an operation by a user has become more efficient.

These and other aspects of the invention will be apparent from and elucidated with reference to the embodiments described hereinafter.

DETAILED DESCRIPTION OF EMBODIMENTS

Figure 1:
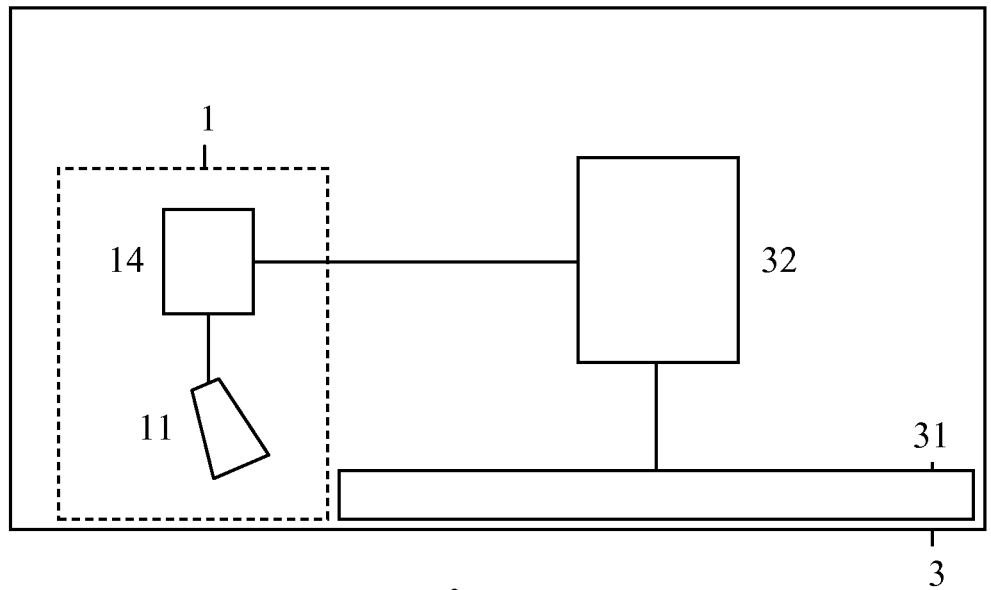
FIG. 1 shows a device comprising an apparatus.

In the FIG. 1, a device is shown comprising an apparatus. The apparatus 1 comprises a detector 11 in the form of a 3D camera and a converter 14 coupled to the detector 11. The device 3 further comprises a screen 31 and a processor 32. The converter 14 may be another processor and/or may form part of the processor 32.

Figure 2:
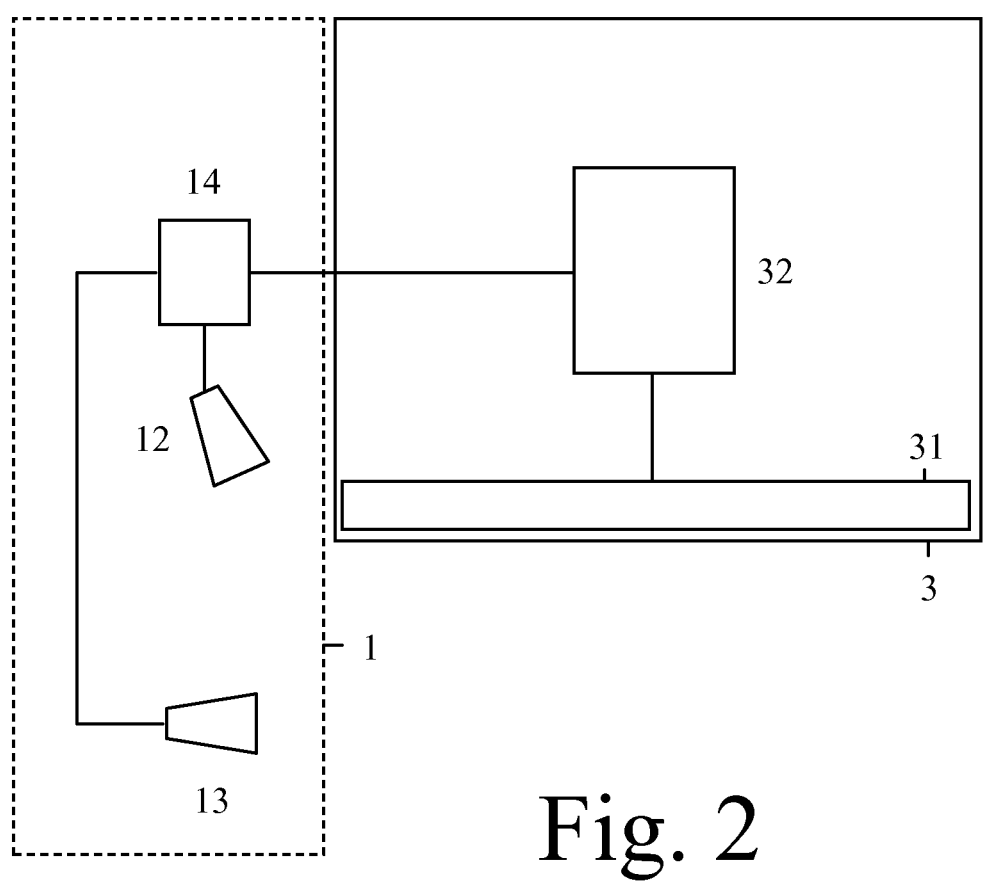
FIG. 2 shows a device and an apparatus separately from each other.

In the FIG. 2, a device and an apparatus are shown separately from each other. The apparatus 1 comprises a detector 12-13 in the form of a first 2D camera and a second 2D camera and a converter 14 coupled to the detector 12-13. The device 3 comprises a screen 31 and a processor 32 coupled to the converter 14. The converter 14 may be another processor.

Other kinds of detectors are not to be excluded, such as detectors for detecting absolute positions such as global positioning system detectors and local positioning system detectors, detectors for detecting disturbances in electromagnetic fields, detectors based on radar or sonar technology etc.

Figure 3:
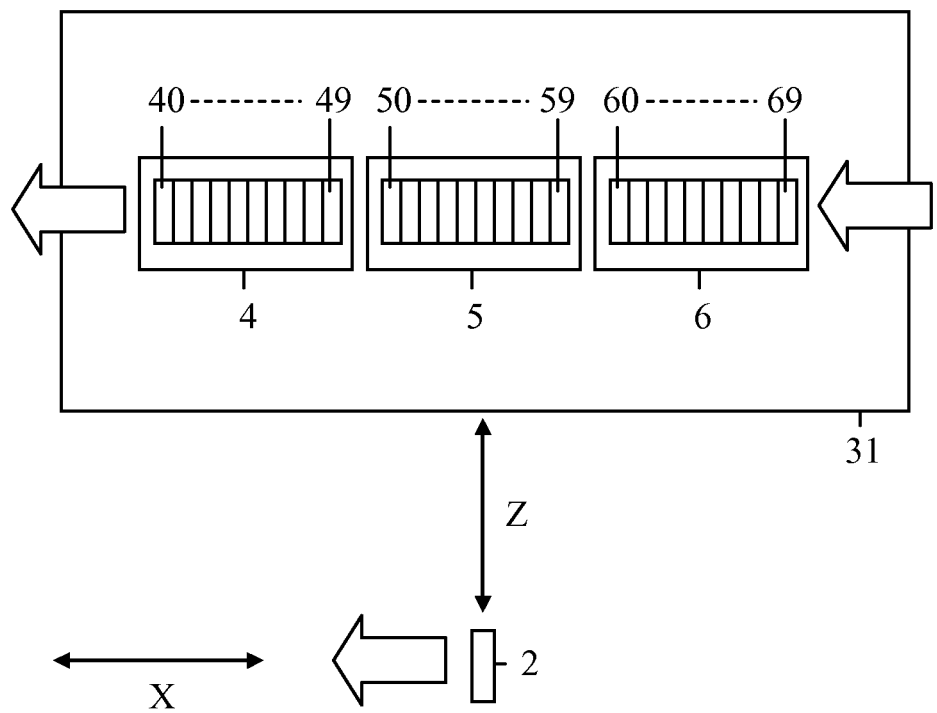
FIG. 3 shows (upper part) browsing groups of elements on a screen and (lower part) browsing within a group of elements on the screen.
Figure 3:
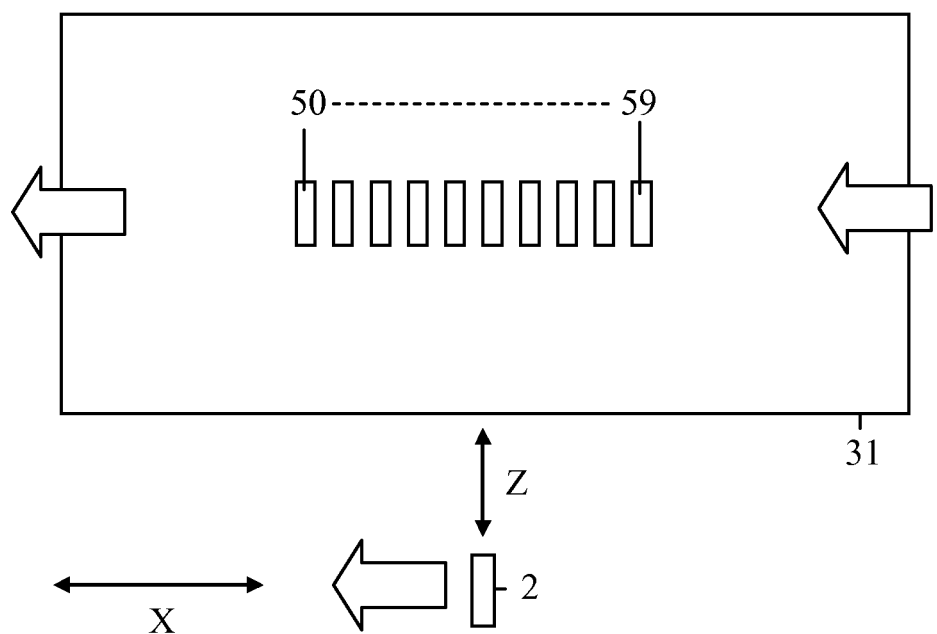

In the FIG. 3, in the upper part the browsing of groups of elements on a screen is shown and in the lower part the browsing within a group of elements on the screen is shown. In the upper part of the FIG. 3, a screen 31 is shown (front view) that is displaying three groups 4-6 of each ten elements 40-49, 50-59 and 60-69. Further, an object 2 is shown (top view), such as for example a body part or a physical object held by the body part or a physical object coupled to the body part etc. The body part may be for example a hand or a finger or an arm or a foot or a leg or a nose etc. The elements 40-69 may be for example icons or symbols or thumbnails or windows etc. on the screen 31. The elements 40-69 may represent data stored in a computer, such as a picture or a program or audio or video etc. In the upper part of the FIG. 3, the object 2 is making a movement to the left, as indicated by the arrow, for example by a user who is waving the fingers of a hand to the left (X direction). This is done at a first distance from the screen 31 (Z direction).

In the lower part of the FIG. 3, the screen 31 is shown (front view) that is displaying the ten elements 50-59. Further, the object 2 is shown (top view). Here, the object 2 is making again a movement to the left, as indicated by the arrow, for example by a user who is waving the fingers of a hand to the left (X direction). But here this is done at a second distance from the screen 31 (Z direction), which second distance is smaller than the first distance. As a result, the user is no longer browsing the groups 4-6, but the user is now browsing the elements 50-59 within one group 5 of the groups 4-6. Thereby, the elements 50-59 may be enlarged or not and may be shown more separately from each other or not.

So, generally, here the apparatus 1 is arranged for controlling the element 40-69 shown on the screen 31. The detector 11-13 is arranged for detecting a first feature of an object 2 in a first dimension and a second feature of the object 2 in another second dimension. The converter 14 is arranged for converting the first feature into an action to be performed on the element 40-69. According to a great improvement, the action may depend on the second feature.

Preferably, the first feature may be a movement of the object 2 and the second feature may be a position of the object 2. The first dimension may be a direction X parallel to the screen 31 and the second dimension may be a direction Z perpendicular to the screen 31.

As shown, the action may comprise browsing a plurality of groups 4-6 of elements 40-69 for the position being a first position and the action may comprise browsing (within) one group 5 of the groups 4-6 for the position being another second position.

Similarly, alternatively, the action may comprise browsing one or more groups 4-6 of elements 40-69 at a speed that depends on the position. Similarly, alternatively, the action may comprise browsing at a relatively general scale for the position being a first position and the action may comprise browsing at a relatively specific scale for the position being a different second position.

Said controlling is also known as a gesture based control. The position can be defined in view of the screen 31 and/or in view of another object. The position may be an absolute position, for example with respect to the screen 31, and may be a relative position, for example with respect to another object. The other object could for example be another body part or the rest of the body. In case the position is an absolute position, the detector 11-13 should be able to make absolute detections. In case the position is a relative position, the detector 11-13 needs only to make relative detections, by detecting both objects and their relative positions, without the need for making absolute detections.

Figure 4:
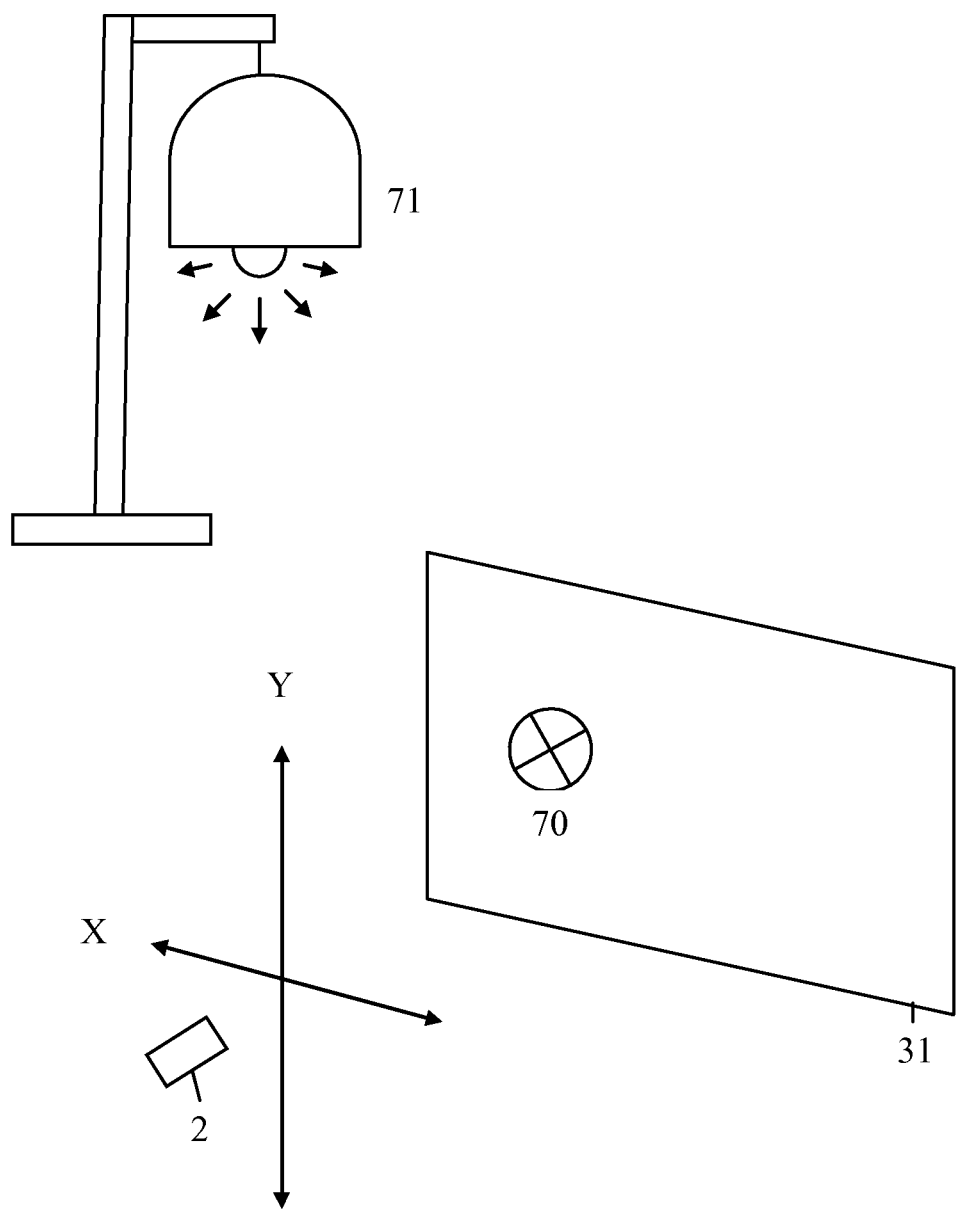
FIG. 4 shows an item represented by an element on a screen and controlled via an object.

In the FIG. 4, an item 71 is shown represented by an element 70 on a screen 31 and controlled via an object 2. Here the item 71 is a lamp, but alternatively the item may be an appliance, an audio player, a video player or a product such as a consumer product or a professional product etc. The item 71 is generally a controllable item located separately from the screen 31.

Generally, here the apparatus 1 is arranged for controlling the item 71 represented by the element 70 on the screen 31. The detector 11-13 is arranged for detecting a first feature of an object 2 in a first dimension and a second feature of the object in another second dimension. The converter 14 is arranged for converting the first feature into an action to be performed on the item 71. According to a great improvement, the action may depend on the second feature.

Preferably, the first feature may be a movement of the object 2 and the second feature may be a position of the object 2. Here, the first dimension may be a direction X parallel to the screen 31 and the second dimension may be another direction Y parallel to the screen 31, with both directions X and Y for example being perpendicular directions.

The action may comprise adjusting a first parameter of the item 71 in dependence of the movement and the action may comprise adjusting another second parameter of the item 71 in dependence of the position. For the item 71 in the form of the lamp that produces light, via the movement for example a brightness of the light can be adapted and via the position for example a color of the light can be adapted.

Alternatively, for an item in the form of an audio player that produces audio, via the movement for example a volume of the audio can be adapted and via the position for example a frequency of the audio can be adapted, or, for different positions, the volume of different frequency components can be adapted etc.

In addition, according to a further improvement, the converter 14 may be arranged for converting the second feature into information to be shown on the screen 31 or to be reproduced otherwise, to provide feedback to a user on the screen 31 or otherwise via audio or via a signal to be sent to the object 2 or the item 71 etc. for assisting purposes.

Alternatively and/or in addition, the second feature may be a change in a position of the object 2, in other words a (temporary) movement of the object 2, whereby (temporarily) the first feature with the movement of the object 2 could be stopped. So, the first and second features should not be looked at too limitedly. Similarly, the speed and/or the browsing in the FIG. 3 may be adjusted for movements and positions in the directions X and Y, and the parameters in the FIG. 4 may be adjusted for movements and positions in the directions X and Z or Y and Z etc. Each time, instead of two dimensions, three dimensions may be used as well, and even a fourth dimension in the form of a time or a date or an amount of light or an amount of noise or a temperature or another feature may be introduced.

Figure 5:
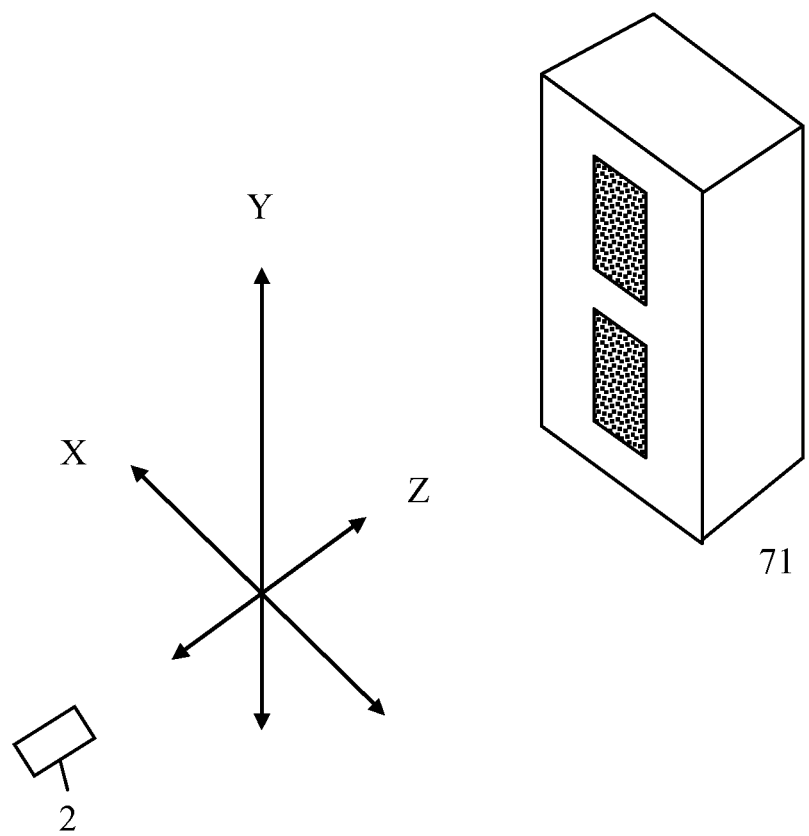
FIG. 5 shows an item not represented by an element on a screen but still controlled via an object.

In the FIG. 5, an item is shown that is not represented by an element on a screen but that is still controlled via an object. Here, the item 71 is in the form of a loudspeaker. By moving the object 2 at a first distance (expressed in a direction Z) from the item 71 parallel to the loudspeaker (for example in a direction X) an audio volume is controlled (for example to the left: lower audio volume, and to the right: higher audio volume) and by moving the object 2 at a second distance (expressed in a direction Z) from the item 71 parallel to the loudspeaker (for example in a direction X) the audio track selection is controlled (for example to the left: previous song, and to the right: next song). Thereby, the second distance should be different from the first distance and may be larger or smaller than this first distance. This way, different zones have been created, and the same movement gets its own different meaning per different zone.

For the item 71 in the form of a loudspeaker as shown in the FIG. 5, one or more detectors not shown here may form part of this item 71 or may form part of an apparatus not shown here. Further, the item 71 may be provided with a unit not shown here such as one or more light emitting diodes etc. for providing feedback to a user to indicate in which zone the user is moving the object 2, to assist the user.

So, for example a gesturing distance, for example relative to the body or more absolutely, or another for example horizontal or vertical position, for example relative to the body or more absolutely, may be linked to a level of browsing or scrolling, whereby a number of elements can be browsed or scrolled. Possibly, on-screen feedback is given to indicate a level of browsing or scrolling that presents a range of elements that can be browsed or scrolled.

According to a gesture tracking version, hand or finger tracking is used to browse or scroll through elements. The hand or the finger at the left side of the body could be mapped to a first element of a group. The hand or the finger at the right side of the body could be mapped to the last element of the group. According to a discrete gesture version, left and right swipes are used to jump a number of elements within the group. When the hand or the finger is close to the body, big jumps are made and the complete set of elements can be navigated. When the hand or the finger moves away from the body, swipes will result in smaller jumps within the element set.

With mode switching, an image browser application can be created. The user can browse through medical XR images using horizontal gestures. Gestures which are made close to the body are used to browse through individual runs (a run is a sequence of images made in one revolution of the XR machine). Whenever the user stretches his arm, the browsing mode changes and individual images in a run can be browsed with left-right movements.

According to dynamic range image browsing, the range of images that can be browsed is coupled to a distance of gesture interaction. For example when the user makes gestures close to the body, the movement from left to right is mapped to all images within the run. When the hand is at the left side, the first image is presented. Moving from left to right will flick through the images in the set. When the hand is at the right side, the last image is presented. Typically the set will have hundreds of images, in a medical XR environment. When the user moves the hand closer to the screen, the range of images may be narrowed, and a selection can be browsed. The image in focus may be used as a middle image in this selection. The mapping has been given a more dynamic character to give the user more control and allow fast browsing combined with more fine grain image-by-image viewing.

The principles of dynamic range gesture control can also be applied when using discrete gestures (left or right swipes). In the above example, a swipe will jump a first number of images to the left or right. When the swipe gesture is performed closer to the screen this jump will be a second number of images smaller than the first number of images, possibly equal to one to browse image-by-image.

Summarizing, apparatuses 1 for controlling elements 40-70 possibly shown on screens 31 or items 71 possibly represented by the elements 70 comprise detectors 11-13 for detecting features of objects 2 such as body parts in first and second dimensions and converters 14 for converting first features into actions for the elements 40-70 or the items 71. By making the actions dependent on second features, a number of possibilities is increased. First features may be movements of the objects 2 and second features may be absolute or relative positions of the objects 2. First dimensions may be parallel to the screens 31 and second dimensions may be perpendicular or parallel to the screens 31, or vice versa. Actions may comprise browsing groups 4-6 of elements 40-69 at position dependent speeds or browsing one or more groups 4-6 depending on the positions. The items 71 may be lamps, appliances, audio players, video players, whereby their parameters may be adjusted in dependence of the movements and the positions.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for controlling an item represented by an element displayed on a screen, the apparatus comprising:
    a detector configured to detect a first feature of an object in a first dimension and a second feature of the object in a second dimension, the first dimension being a direction (X) parallel to the screen and the second dimension being a direction (Z) perpendicular to the screen; and
    a converter configured to convert the first feature into an action to be performed on the item, the action depending on the second feature, wherein the first feature represents a movement of the object and the second feature represents a position of the object at a distance form the screen, and the action comprising browsing.

2. The apparatus of claim 1, the browsing comprising:
    browsing a group of elements comprising the element at a speed that depends on the position of the object.

3. The apparatus of claim 1, the browsing comprising:
    browsing a plurality of groups of elements, one group comprising the element, for the position being at a first position of the object, and the browsing comprising browsing one of the groups for the position being at a second position of the object.

4. The apparatus of claim 1, the browsing comprising:
    browsing at a relatively general scale for the position being at a first position of the object, and the browsing comprising browsing at a relatively specific scale for the position being at a second position of the object.

5. The apparatus of claim 1, the object being a body part or a physical object held by or coupled to the body part, and the position of the object being a relative position with respect to a second object, the second object being another body part or a rest of the body.

6. The apparatus of claim 1, the converter being arranged for converting the second feature into information to be shown on the screen or to be reproduced otherwise.

7. The apparatus of claim 1, the detector being arranged to detect the movement of the object or the position of the object in a third dimension, the third dimension being in a second direction (Y) parallel to the screen and different from the direction (X).

8. The apparatus of claim 1, the second feature defining an aspect or a type or a parameter of the action.

9. A device comprising:
    a display screen; and
    an apparatus comprising:
        a detector configured to detect a first feature of an object in a first dimension and a second feature of the object in a second dimension, the first dimension being a direction (X) parallel to the screen and the second dimension being a direction (Z) perpendicular to the screen; and a converter configured to convert the first feature into an action to be performed on the element or the item, the action depending on the second feature, wherein the first feature represents a movement of the object and the second feature represents a position of the object at a distance from the screen.

10. A method for controlling an item represented by an element displayed on a display screen, the method comprising:

detecting by a detector a first feature of an object in a first dimension and a second feature of the object in a second dimension, the first dimension being a direction (X) parallel to the display screen and the second dimension being a direction (Z) perpendicular to the display screen; and converting by a converter the first feature into an action to be performed on the item, the action depending on the second feature, wherein the first feature being a movement of the object and the second feature being a distance of the object with respect to the display screen, and the action comprising browsing.

11. A computer program product stored on a tangible computer readable medium for performing a method as defined in claim 10 when executed by the detector and converter.

* * * * *